United States Patent [19]
Wadlow et al.

[11] Patent Number: 5,284,053
[45] Date of Patent: Feb. 8, 1994

[54] CONTROLLED FLOW VOLUMETRIC FLOWMETER

[75] Inventors: David Wadlow, Basking Ridge, N.J.; Lawrence M. Layden, Seneca, S.C.

[73] Assignee: The BOC Group, Inc., New Providence, N.J.

[21] Appl. No.: 819,042

[22] Filed: Jan. 10, 1992

[51] Int. Cl.⁵ .................. G01F 1/05; G01F 1/34
[52] U.S. Cl. .................. 73/199; 73/861.81; 73/861.87
[58] Field of Search ........ 73/253, 261, 199, 861.77, 73/861.81, 861.83, 861.87

[56] References Cited

U.S. PATENT DOCUMENTS

| | | | |
|---|---|---|---|
| 1,797,233 | 3/1931 | Huebotter | 19/9 |
| 2,080,183 | 5/1937 | Pigott | 73/199 |
| 3,288,197 | 11/1966 | Rose | 158/115 |
| 3,550,426 | 12/1970 | Griffo | 73/3 |
| 3,633,420 | 1/1972 | Holzem | 73/199 |
| 3,785,757 | 1/1974 | Stamm | 73/259 X |
| 3,981,194 | 9/1976 | Blise et al. | 73/253 X |
| 4,120,033 | 10/1978 | Corso et al. | 364/510 |
| 4,193,299 | 3/1980 | Holzem et al. | 73/199 |
| 4,305,302 | 12/1981 | Holzem et al. | 73/861.83 |
| 4,641,522 | 2/1987 | Lopresti | 73/261 |
| 4,878,454 | 11/1989 | Cann | 73/861.77 X |

FOREIGN PATENT DOCUMENTS

1585098  2/1981  United Kingdom ............ 73/199

*Primary Examiner*—Herbert Goldstein
*Attorney, Agent, or Firm*—Roger M. Rathbun; Larry R. Cassett

[57] ABSTRACT

Apparatus and method for metering the flow rate of a fluid through a conduit in which a low inertia transducer is placed between the inlet and outlet, the transducer having a substantially cylindrical housing and a rotatable element concentric to the housing which together define an arcuate pathway for the flow of the fluid. A pressure sensor generates a pressure error signal corresponding to a change in pressure between the inlet and outlet and translates the same into a detectable signal which is used to change the speed of the rotatable element to reduce the differential pressure between the inlet and outlet.

14 Claims, 7 Drawing Sheets

VARIABLES:
$F_d(s)$    FLOW DISTURBANCE
$E(s)$    FLOW ERROR
$V_p(s)$    ACTUATING SIGNAL FROM PRESSURE SENSOR
$V(s)$    VOLTAGE TO MOTOR
$S(s)$    FLOW TRANSDUCER SHAFT SPEED − READOUT
$F(s)$    FLOW TRANSFER FUNCTIONS:
$P(s)$    PRESSURE TRANSDUCER
$C(s)$    CONTROL ELEMENTS
$M(s)$    ELECTRIC MOTOR
$TR(s)$    FLOW TRANSDUCER CLOSED−LOOP TRANSFER FUNCTION, $CL(s)$:

$$CL(s) = G(s)/(1 + G(s))$$

where: $G(s) = P(s) \cdot C(s) \cdot M(s) \cdot TR(s)$

CONTROLLED FLOW VOLUMETRIC FLOWMETER

TECHNICAL FIELD

The present invention is directed to a flowmeter which measures the flow of a gas from an inlet region to an outlet region. The flowmeter employs a mechanical flow transducer element which provides a volumetric flow measurement capability which is independent of the gas composition and can achieve flow measurement performance of high accuracy, wide dynamic range and rapid response with minimal pressure drop.

BACKGROUND OF THE PRIOR ART

Flowmeters are employed to monitor the rate at which a gas travels through a conduit. High performance flowmeters are required for specialized applications such as the monitoring of the flow of anesthetic gas mixtures into and out of a surgical patient.

When a gas flows through a conduit it loses pressure head due to wall friction. This pressure loss, called the frictional pressure drop, is unrecoverable (permanent) and contributes to the flow resistance of the conduit. Additionally, if the gas encounters a mechanical moving obstruction in the conduit which is rotated or moved by the passage of the gas, then the gas loses an amount of energy equal to the work needed to move the mechanical component. This energy loss also manifests as an unrecoverable pressure drop.

Many volumetric flowmeters are equipped with transducers which are passively driven by the gas flow. Such transducers therefore suffer from a loss of energy as a result of a permanent pressure drop.

Active transducers are devices in which the transducer is driven by an external force such as a motor. When a change occurs in the flow rate, there occurs a mismatch between the speed of the transducer and the flow of gas therethrough. As a result, a differential pressure drop is generated between the inlet and outlet regions. Once the pressure drop is detected, the flowmeter acts to change the speed of the transducer and thereby eliminate the pressure drop.

These principles have been demonstrated previously and are described in a number of patents. For example, Huebotter, U.S. Pat. No. 1,797,233 discloses a fluid-metering gear pump employing two-lobed intermeshing displacement members which are rotatably mounted within a casing. The speed of the pump is controlled so as to maintain a near zero differential pressure between the inlet and outlet regions and thereby provide a flow rate measurement.

Holzem, U.S. Pat. No. 3,633,420 discloses a gear pump driven by a motor control system in response to a differential pressure across the pump. The gear pump operates with a pressure difference sensor system containing both a proportional and an integral pressure difference sensor.

Holzem et al., U.S. Pat. No. 4,193,299 discloses a positive displacement fluid flow metering device employing an additional bypass channel containing a pressure sensor and a servo motor which is responsive to the pressure sensed by the sensor to thereby control the operation of the device.

Holzem et al., U.S. Pat. No. 4,305,302 discloses a flow transducer element which incorporates rotors. The flow measuring device incorporates two differential pressure sensors of different sensitivity and means for automatically correcting for zero drift at periodic time intervals.

Groffo U.S. Pat. No. 3,550,426 discloses a cylindrical transducer having a series of vanes on its surface. A pair of differential pressure measurements are taken in each channel of a split flowmeter to compute a result indicative of the deviation of actual meter response from its factory calibration.

Such known flowmeters are disadvantageous because of extended response times in which a considerable time elapses between the generation of a pressure drop and a change in the speed of the transducer. Since the change in speed of the transducer is a function of the torque of the motor and the mechanical load of the transducer, a low inertia transducer would reduce the response time.

SUMMARY OF THE INVENTION

The present invention is generally directed to a flowmeter which is capable of highly accurate, rapid response, measurements of the volumetric rate of flow of a gas through a conduit in a manner which is in principle independent of gas composition, pressure and temperature. The flowmeter includes a low inertia transducer means adapted to minimize the response time to changes in pressure in the conduit.

There is also provided a feedback system to control the rotational speed of the transducer and monitor the rotational speed as a measure of the gas flow rate through the transducer. The operation of the flowmeter is characterized by a series of fundamental, rather than empirical, equations which embody the basic principle of operation of the transducer element. It is thus possible to design a flowmeter in accordance with the present invention using these equations, for specific applications where a certain accuracy, flow range and/or response time performance is required.

In particular, the present invention is directed to a flowmeter comprising a gas inlet region and a gas outlet region. Connecting the respective inlet and outlet regions is a transducer means which provides a pathway for the flow of the gas while its flow rate is being measured. The transducer means is designed to minimize the time needed to respond to changes in pressure within the conduit.

In accordance with the invention, the transducer means is externally driven. As a result, the gas does not provide the work needed to drive the transducer and does not experience a permanent pressure loss. The transducer means comprises a substantially cylindrical housing and a rotatable element concentric with the housing. Together they define an arcuate pathway for the flow of the gas from the inlet region to the outlet region.

There is also provided a feedback control system including a means for detecting a change of pressure of the gas between the inlet and outlet regions as a pressure error signal and for translating the pressure error signal into a corresponding detectable signal such as an electrical signal. A standard differential pressure sensor which converts a differential pressure to an electrical signal may be used for this purpose.

The feedback control system acts to change the speed of the rotatable element of the transducer means in response to the detectable signal emitted by the pressure sensor to thereby obtain a continuous measurement of the flow rate.

The feedback control system may be modified to have the differential pressure sensor error signal also connected to a means which converts the sensor error signal via a numerical factor into an equivalent flow rate error signal. This flow rate error signal may then be arithmetically combined with a flowmeter output signal to provide a correction which will act primarily to further enhance the response to rapid flow changes with transiently reduced accuracy.

BRIEF DESCRIPTION OF THE DRAWINGS

The following drawings in which like reference characters indicate like parts are illustrative of embodiments of the invention and are not intended to limit the scope of the invention as encompassed by the claims forming part of the application.

FIG. 2b is a front view of the transducer device shown in FIG. 2a;

FIG. 2c is a rear view of the transducer device shown in FIG. 2a;

FIG. 2d is a longitudinal cross-sectional view of the transducer device shown in FIG. 2a;

DETAILED DESCRIPTION OF THE INVENTION

Figure 1:
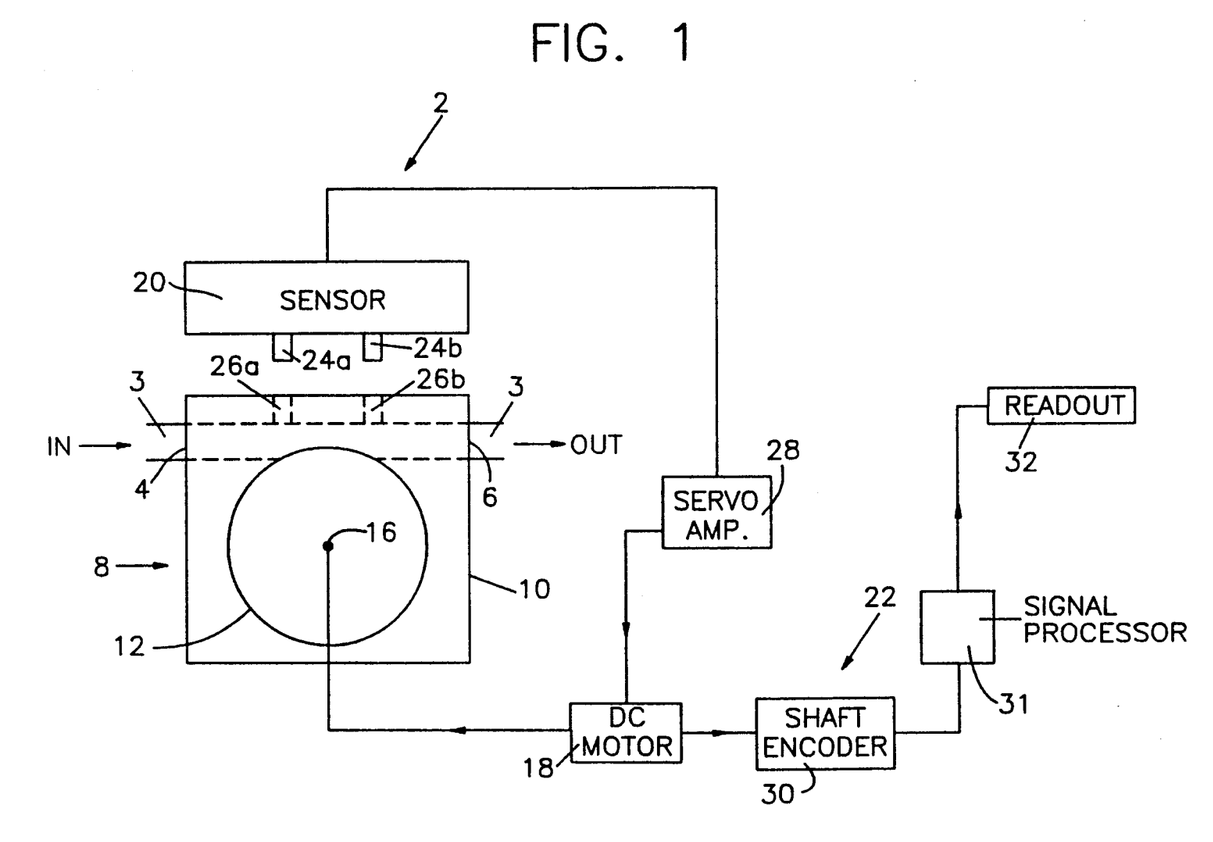
FIG. 1 is a schematic view of an embodiment of the flowmeter of the present invention.

Referring to the drawings and particularly to FIG. 1, there is shown a flowmeter system in accordance with the present invention. The flowmeter system 2 includes a conduit 3 having two ports (4, 6) for the flow of the gas into and out of the flowmeter system 2. Since the transducer is bidirectional, it is capable of measuring reversing flows. As such, ports 4 and 6 can serve as both inlet and outlet openings, depending on the flow direction. For purposes of the present description, port 4 is the inlet and therefore receives the fluid and port 6 is the outlet.

Between the inlet 4 and outlet 6 is a mechanical flow transducer 8 which provides a pathway for the flow of the gas from the inlet 4 to the outlet 6 while the gas flow rate is measured.

The transducer 8 is comprised of a rotatable transducer element 12 which defines a pathway for the flow of the gas from the inlet 4 to the outlet 6 as explained in detail hereinafter.

The transducer element 12 is integrally connected to a shaft 16 which is connected to a power source such as a D.C. motor 18. The energy output of the motor 18 enables the shaft 16 to rotate and thereby rotate the transducer element 12 in response to changes in pressure from the inlet 4 to the outlet 6.

The transducer 8 is connected to a differential pressure sensor 20 which detects any change in the differential pressure across the conduit 3 and generates a detectable signal such as an electrical signal which is transmitted to a control system shown generally by numeral 22. The sensor 20 has a pair of ports 24a and 24b which are insertable into respective taps 26a and 26b in the inlet 4 and outlet 6 regions of the conduit 3, respectively. The ports 24a and 24b provide a connection to the pressure transducing elements of the sensor for the generation of the electrical signal. When the sensor 20 detects a change in differential pressure due to a change in the flow rate of the gas, the electrical signal is sent to the control system 22.

The control system 22 includes a servo amplifier 28 which receives the electrical signal from the sensor 20 as an error signal and transmits the required power to the motor 18 to rotate the transducer element 12 in the appropriate direction at the appropriate speed so as to reduce the error. The rate of rotation of the motor 18 is detected by a tachometer or shaft encoder 30 which may be translated by a signal processing device 31, such as a digital to analog converter or a computer, into a readable signal for providing a flow measurement readout 32.

The D.C. motor which is preferably employed in the present invention has characteristics similar to that of Escap ® Model 23DT12-216E manufactured and distributed by Portescap U.S., Inc. of Hauppauge, N.Y. This motor is small, (the cylindrical body shell measures 48.5 mm long by 23 mm diameter), lightweight (110 g), and has a low inertia ($6.1 \times 10^{-7}$ kg-m$^2$) ironless rotor with high peak current capabilities. The motor also has a relatively high torque constant of 23.3 mNm/A, and can temporarily deliver torques as high as 80 mNm. The maximum current draw is therefore 3.4 A, while the motor has a continuous rating of 0.9 A. The maximum speed of the motor is 12,000 RPM.

The servo amplifier 28 has a power rating which satisfies the requirements of the motor. For the motor described above, the servo amplifier 28 has a continuous rating of at least 0.9 A and a peak rating of at least 3.4 A. The amplifier also has gain control and preferably a means for providing and adjusting the degree of integral control. Such servo amplifiers are manufactured by Copley Controls Corp. under the model 200 series.

The shaft encoder 30 is preferably a low inertia optical encoder which operates by translating the rotation of a shaft into interruptions of a light beam which are then output as electrical pulses. The number of cycles per revolution of the transducer element is desirably in the range of 100 to 512. An encoder which may be employed in the present invention is the HEDS-5000 series manufactured by Hewlett Packard Corp.

The pressure sensor device 20 is preferably lightweight having a sensitivity of about 0.5 volts per inch of water, low zero drift with a maximum overpressure of 5 psi, and a fast response. An example of such pressure sensors are those included among the model No. 160 PC Series manufactured by Micro Switch Corp., a division of Honeywell Corp.

In accordance with the present invention, the transducer 8 is designed to have low inertia. This enables the transducer to change speeds rapidly on the order of less than or equal to 100 milliseconds from the time the sensor 20 detects a change in differential pressure across the conduit 3.

The transducer 8 of the present invention provides a well-defined arcuate pathway with smooth boundaries for the flow of gas from the inlet 4 to the outlet 6. For this purpose, it is preferred that the transducer element 12 have a substantially cylindrical shape with a substantially smooth and unobstructed surface. The housing 10 for the transducer element 12 is preferably of the same shape and also concentric to the transducer element 12 to define a smooth pathway for the laminar flow of the gas.

Referring to FIGS. 2a–2d and 3, the transducer 8 includes a housing 10 in operative engagement with the conduit 3 for passing the gas from the inlet 4 to the outlet 6. The housing 10 includes a substantially circular wall 34 defining a cylindrical cavity 36.

The transducer element 12 comprises a cylindrical body 38 having a diameter which enables the transducer element 12 to fit within the cavity 36 of the housing 10 and freely rotate therein. The transducer element 12 is provided with a supporting wall 40 extending substantially perpendicular to the longitudinal axis A—A of the transducer element 12, as shown best in FIG. 2d. The wall 40 has a centrally disposed opening 42 which receives the shaft 16 for rotating the transducer element 12. The junction between the shaft 16 and the opening 42 is preferably sealed with a shaft seal customarily employed in sealing rotatable shafts.

The cylindrical body 38 has a smooth outer surface 44 which is spaced apart from the wall 34 to define the pathway 14. The depth of the pathway 14 for the flow of the gas from the inlet 4 to the outlet 6 is determined by the design requirements of a specific metering application.

In order to allow for the free rotation of the transducer element 12, a gap 46 is provided between the transducer element 12 and the other surfaces comprising the cavity 36. A small amount of gas will leak across the gap 46 during operation of the transducer 8. Leakage of the gas from the flow path 14 is minimized by making the depth of the gap 46 smaller, preferably much smaller, than the depth of the pathway 14. If, for example, the pathway 14 has a depth of about one mm, then the depth of the gap may typically be on the order of about 0.05 mm. Leakage across the gap 46 does not affect the linearity of the device.

It is also desirable to construct the transducer 8 out of light-weight materials to minimize the mechanical load. Aluminum is the most preferred material although rigid plastics such as polyethylene and polypropylene may be used.

The transducer element 12 preferably has a low inertia and is therefore preferably substantially hollow. The inertia of the transducer element 12 is a function of its radius and the width of the flow path in accordance with the following equation:

$$I = K_i r^4 \cdot W \qquad 1$$

wherein
$K_i$ is a constant;
r is the radius of the transducer element; and
W is the width of the flow path.

Thus, the inertia of the transducer 8 is improved by reducing the radius of the transducer element 12 and the width of the flow path. As previously indicated, the transducer 8 is designed such that the gas flow passes through the pathway 14 bounded on one side by the wall 34 and on the opposite side by the outer surface 44 of the transducer element 12. The dimensions of the pathway are also such that under all operating conditions the flow of gas through the pathway is laminar. As a result, the pressure difference between the inlet 4 and the outlet 6 of the conduit 3 is a function of the gas flow rate, the shape of the pathway 14, the gas viscosity and the speed of the transducer boundary. At a certain transducer speed this pressure difference will be zero and that specific speed is directly related to the gas flow rate via a calibration constant which is believed to be independent of any properties of the gas.

Figure 2A:
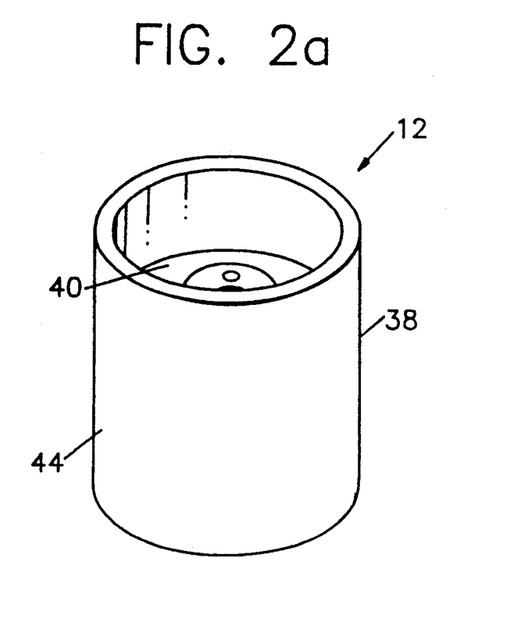
FIG. 2a is a perspective view of a transducer device used in conjunction with the flowmeter of FIG. 1.
Figure 2B:
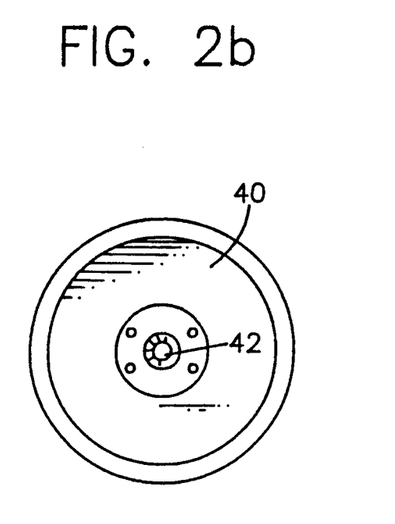
Figure 2C:
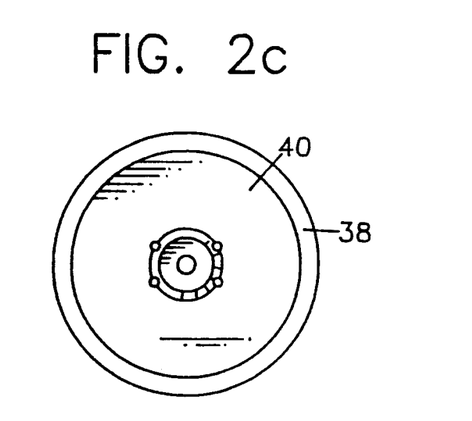
Figure 2D:
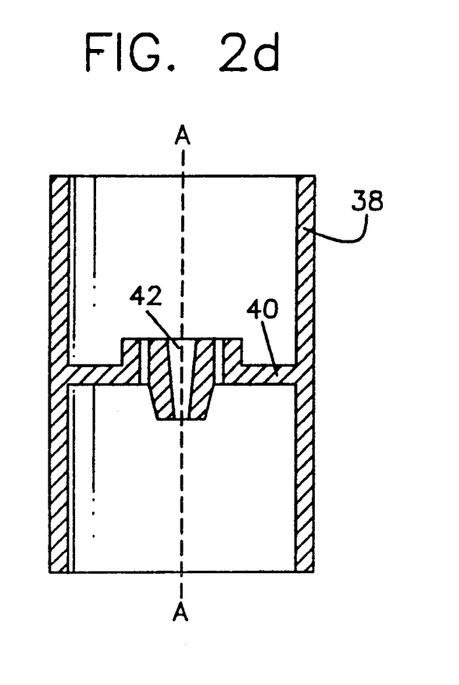
Figures 3, 4:
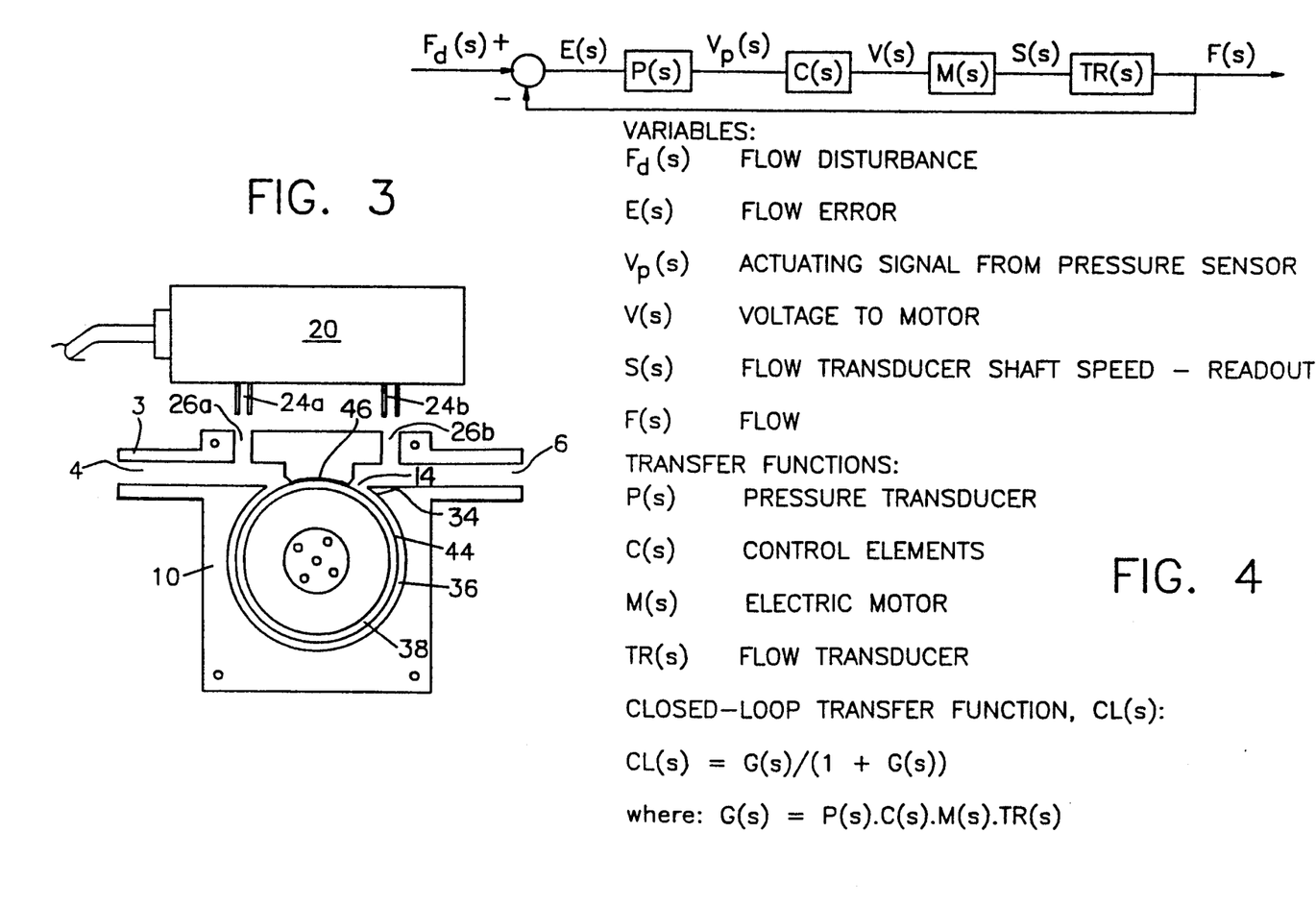
FIG. 3 is a side view of the transducer device situated in the flowmeter of the present invention.
FIG. 4 is a block diagram of the feedback control system shown in FIG. 1 depicting the operation of the flowmeter in accordance with the present invention.

A simple solution of the Navier Stokes equation for gas flow in the pathway 14 including flow through the gap 46, reveals that the flow rate measuring capability of the system is given by the equation:

$$F = 10^{-6} \pi \cdot f \cdot r \cdot W \cdot (a-b) \qquad 2$$

wherein
F is the gas flow rate in liters per minute;
f is the transducer element speed in revolutions per minute;
r is the radius of the transducer element in mm;
W is the width of the flow path in mm;
a is the depth of the flow path in mm; and
b is the depth of the leakage gap in mm.

Clearly, the maximum flow rate measuring capability of the system is determined by the maximum speed of the transducer element as determined by the D.C. motor specification. Hence $$F_m = 10^{-6} \pi \cdot f_m \cdot r \cdot W \cdot (a-b) \qquad 3$$

wherein:
$F_m$ is the maximum flow measuring capacity in liters per minute; and
$f_m$ is the maximum transducer element speed in revolutions per minute.

From the above equations, it can be seen that the flow rate measuring capability of the system is directly proportional to the rotational speed and radius of the transducer element and the dimensions of he flow path. In particular, since the flow measurement is obtained via a measurement of the rotational speed, the equation indicates that the device is linear.

The accuracy of measurement of the flow rate is governed by the following equation:

$$F_e = \frac{K_p \cdot W \cdot a^3 \cdot \Delta P_S}{\mu \cdot L} \qquad 4$$

wherein
$F_e$ is the flow measurement error;
$K_p$ is a constant;
W is the width of the pathway;
a is the depth of the pathway;
$\Delta P_s$ is the differential pressure sensor sensitivity;
$\mu$ is the absolute gas viscosity; and
L is the length of the pathway in the direction of the flow.

Assuming $b << a$, the accuracy of the measurement expressed as a fraction of the flow capacity is governed by the equation:

$$\frac{F_e}{F_m} = \frac{K \cdot \Delta P_S}{f_m \cdot \mu} \cdot \left[\frac{a}{r}\right]^2$$

wherein

K is a constant and the remaining variables are as defined above.

The accuracy of the measurement of the gas flow for the transducer therefore is a function of the depth of the flow path and the sensitivity of the pressure sensor. For example, one could increase the accuracy by a factor of four by simply halving the size of the gap dimension at the expense of halving the maximum flow rate. One could double the accuracy by reducing the depth of the pathway by 67% and still retain approximately ⅓ of the flow capacity. Alternatively, one could increase only the radius of the transducer and thereby enhance both the accuracy and flow capacity, but the rotor inertia would increase markedly to the detriment of response time. Accordingly, knowing the inertia of the transducer allows one to select an electric motor with the appropriate torque characteristics to meet a required response time performance.

Under steady flow conditions, the degree of accuracy to which the speed of the transducer element indicates the flow rate is therefore related to the sensitivity of the differential pressure sensor and also the nature of the control system and motor. However, the sensitivity of the differential pressure sensor directly affects the transducer design.

Very sensitive differential pressure sensors, such as capacitance manometers, are relatively large and expensive, and have a relatively long response time compared with less sensitive, less expensive, but faster silicon diaphragm type devices. It is therefore preferable to design the flow transducer in such a way as to maximize the developed pressure drop per unit flow error. One way to improve the pressure drop per unit flow error is to utilize a flow path with a smaller flow cross section, since the pressure drop at constant flow is inversely proportional to the third power of the linear gap dimension. However, reducing the gap dimension also reduces the maximum flow measuring capacity for a fixed maximum transducer speed. Another way to improve the pressure drop is to lengthen the flow path. Accordingly, the transducer of the present invention is provided with the longest practical flow path around the transducer element.

The time necessary for the transducer to respond to a change in flow may be important in some applications. A first order response time is defined as the tim it takes for the transducer to indicate about 63% of a step change in the flow rate. This time is determined by the combination of the intrinsic time constants of the components in the system as indicated by the transfer function shown in FIG. 4.

FIG. 4 is a block diagram of the flowmeter control loop shown in the system of FIG. 1 wherein the flow of gas going into the transducer is represented as the controlled variable. Referring to FIG. 4, when a change occurs in the flow rate, a mismatch occurs between the speed of the transducer and the flow of gas therethrough. This results in a differential pressure created between the inlet and outlet. This change in pressure is detected and a signal related to the magnitude and direction of the change is sent to a servo amplifier which controls the speed of the electric motor. The speed of the motor and hence the transducer is adjusted accordingly so as to minimize the flow error. The gas flow through the transducer is then directly related to the speed of the transducer.

The system shown generally in FIGS. 1 and 4 incorporates a differential pressure sensor having an output which connects directly and only to the control system (e.g. the servo amplifier). Thus, the response of the flowmeter system will always lag behind the response of the differential pressure sensor. Under conditions of laminar flow for which the transducer is designed, the magnitude of the differential pressure signal is related linearly to an equivalent flow error by a factor which is the product of a known constant and the reciprocal of the absolute gas viscosity.

Accordingly, the system of the present invention can be modified to enable the pressure sensor error signal to be multiplied by a factor so that it approximates the flow rate error. There is thus provided a separate connection between the sensor and a device which converts the sensor error signal into an equivalent flow rate signal via a user selectable factor and This signal is then combined with the flowmeter system output.

Figure 5:
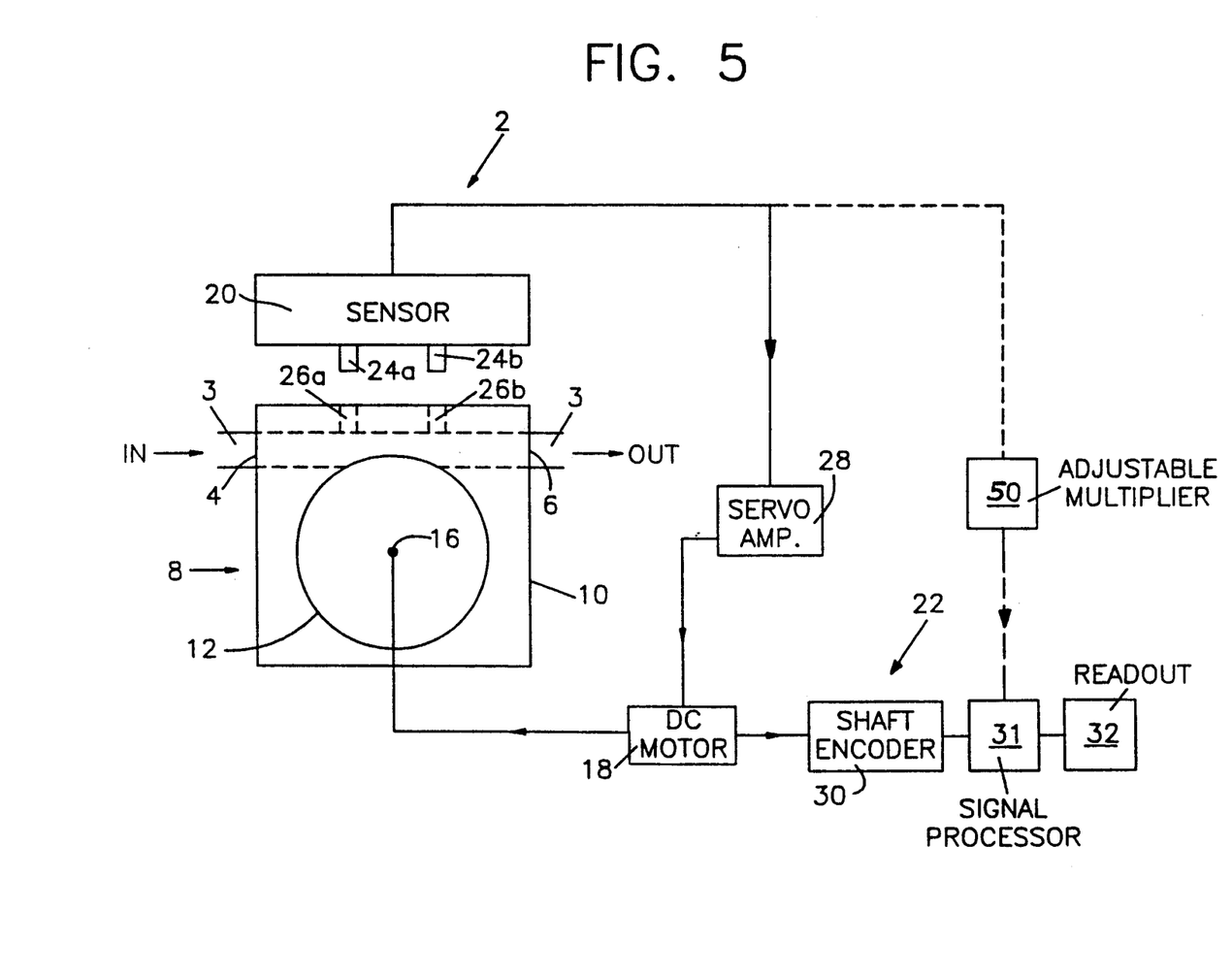
FIG. 5 is a schematic view of another embodiment of the flowmeter of the present invention employing a separate connection between the sensor output and a device which converts the sensor output signal to an equivalent flow rate error signal.

Referring to FIG. 5, the output from the sensor 20 is sent to an electronic multiplier element 50 which converts the signal by a multiple of the original signal to generate an equivalent flow rate signal. This signal is then sent to the signal processing unit 31 which is modified to incorporate a second input to accept this signal and combine it with the flowmeter system output which is derived from the speed of the transducer shaft. The signal processing unit 31 finally translates the signal and sends the translated signal to the readout 32 as described in connection with FIG. 1. It should be noted that the multiplier 40 can be combined in the signal processing device.

The value of the multiplying factor depends on the transducer design and the value of the absolute viscosity of the gas and any flow reading range factor common to the basic system output which is selected by the user. This fast correction factor can be determined via calibration, or estimated by calculation if the gas viscosity or mean gas viscosity is known. The degree to which the gas viscosity varies from the assumed conditions will then directly determine the accuracy of the fast correction. However, under many conditions where such variations are due to moderate variations in composition and temperature, the error in the fast correction will be in the region of only about 10 or 20%. This degree of error will not significantly degrade the accuracy of the overall system under conditions where flow variations occur at a rate which is well within the response time of the basic flowmeter system. Furthermore, this correction will effectively counter much of the inherent control system error and actually enhance the overall accuracy.

In the example that follows, a flowmeter system having a measured first order response time to flow in the region of 50 milliseconds incorporates a differential pressure sensor with a specified maximum response time of 1 millisecond. Hence, in this system, the option described in connection with FIG. 5 extends the response to transient flow conditions which have a characteristic timescale as short as 1 millisecond with a transient degradation in accuracy as described.

As described in the following example, the transducer was controlled automatically in a control loop of the type described in FIG. 1 and the shaft speed was monitored via a shaft encoder. The flowmeter was calibrated against known flows of pure nitrogen gas and carbon dioxide gas using a 3 liter wet test meter manufactured by Precision Scientific Co., Chicago, Ill. The transient response performance was determined versus varying known flows of nitrogen gas.

EXAMPLE 1

A flow transducer in accordance with the present invention was tested using a flow of nitrogen gas of up to 25 liters per minute. The transducer element 12 is made of lightweight aluminum having a weight of 13 grams. It is in the form of a smooth surfaced cylinder having a diameter and width of 40 mm. The cylinder is located inside a cavity 36 in the manner shown in FIG. 3 such that the flow path 14 for the gas has a depth of 0.94 mm. A small leakage gap 46, having a depth of 0.05 mm, is provided between the transducer element 12 and the wall 34 defining the cavity 36.

Typically, the response of the pressure transducer and control elements are much faster than that of the electric motor/transducer combination with the result that the response time of the flow transducer is dominated by the latter components. The motion of the transducer element is governed by the equation:

$$T = I \cdot \dot{\omega} \qquad 6$$

wherein
T is the motor torque;
I is the total inertia; and
$\omega$ is the angular speed of rotation (radians/sec.).

To simplify the prediction, one can approximate the torque curve of the motor to a simple linear relationship versus angular speed:

$$T = A - B \cdot \omega \qquad 7$$

wherein
A,B are constants which can be estimated from the motor specifications.

Combining equations 1 and 2 gives the equation $$I \cdot \dot{\omega} = A - B \cdot \omega \qquad 8$$

The solution to which, for $\omega = 0$ at $t = 0$, is given by:

$$\omega = \frac{A}{B} \cdot \left[ 1 - \exp\left( \frac{-B \cdot t}{I_r + I_l} \right) \right] \qquad 9$$

wherein
$I_r$ is the electric motor rotor inertia; and
$I_l$ is the load inertia (transducer element).

The first order time constant of the response is therefore:

$$\tau = (I_r + I_l)/B \qquad 10$$

Hence given the rotor inertia, the load inertia and the factor B obtained from the specified torque curve of the electric motor one can determine the overall time constant from equation 4.

Alternatively, one can form the ratio of the time constant with a load to the time constant without a load:

$$\frac{\tau_l}{\tau_{nl}} = 1 + \frac{I_l}{I_r} \qquad 11$$

Using the above equation and given the rotor inertia, the load inertia and the time constant of the electric motor one can determine the overall time constant. For example 1 herein where the motor is a Portescap model 23DT12-216E, $$\tau_{nl} = 11 \ ms$$

and $$I_r = 6.1 \times 10^{-7} kg\text{-}m^2$$

The inertia of the transducer element can be calculated knowing the dimensions and precise shape of the element by calculating the inertia of separate geometrical regions and adding the results.

$$\text{By definition:} \quad I = \sum_i m_i \cdot r_i^2 \qquad 12$$

which for cylindrical elements becomes:

$$I = \pi \cdot W \cdot \sum_i \rho_i \cdot r_i^4 \qquad 13$$

wherein
W is the width of the cylindrical element.

In accordance with the foregoing, the inertia about the transducer element axis was calculated to be $2.84 \times 10^{-6}$ kg-m$^2$. Substituting the parameter values in the previous recited equation yields a predicted first order response time for the flow sensor of 63 milliseconds. This compares with a measured response time of 42 milliseconds indicating that the motor performance was comfortably within specification.

A number of factors influence the accuracy of the flow measurement. These include the accuracy with which the rotational speed of the motor shaft is transduced as well as control system errors. However, these factors are peripheral to the transducer and utilizing current technology these sources of error can be rendered negligible.

A further source of error frequently associated with flow measurement concerns the conditioning of the flow at the inlet to the transducer. Due to the design and operating principle of the transducer, errors due to unconditioned flow are essentially non-existent. In fact, the major source of flow measurement error arises from the sensitivity, drift, linearity and repeatability performance of the differential pressure sensor. In addition, this source of error is inherent to the flow measurement concept and is a primary design consideration.

The flow through the pathway must always be laminar. The transducer must be designed such that the value of the Reynolds number for the maximum flow rate to be measured does not exceed a value at which the resulting flow regime would become transitional. For straight conduits, the Reynolds number corresponding to the beginning of transitional flow is typically 2,100. However, in the case of curved conduits it has been found that laminar flow can exist at far higher Reynolds numbers, the main factor being the ratio of the conduit diameter to the radius of curvature.

The Reynolds number for the flow in the rectangular channel may be calculated using the following equation:

$$R_e = \frac{2 \cdot \rho \cdot F}{\mu \cdot W} \text{ (assuming } W >> a\text{)} \qquad 14$$

wherein
$R_e$ is the Reynolds number;
$\rho$ is the gas density;
F is the volumetric gas flow rate;
$\mu$ is the absolute gas viscosity; and
W is the channel width.

For nitrogen gas having a temperature and pressure of 15° C. and 14.7 psia, the Reynolds number corresponding to a flow of 25 liters per minute in the 40 mm wide channel is 1,420, which is far less than 2,100 indicating that the flow is always laminar as required.

Under the prescribed condition of laminar flow, the flow in the pathway 14 is described as plane Poiseuille flow and the pressure drop generated by a given gas flow rate is expressed as:

$$\Delta P = \frac{16 \cdot \mu \cdot F \cdot L}{W \cdot a^3} \qquad 15$$

wherein
$\Delta P$ is the pressure drop between inlet and outlet of the channel;
$\mu$ is the absolute gas viscosity;
F is the volumetric gas flow rate;
L is the channel length in the gas flow direction;
W is the channel width; and
a is the channel depth.

By rearranging the previous equation, one can determine the flow rate required to develop a specific pressure drop across the channel:

$$F = \frac{\Delta P \cdot a^3 \cdot W}{16 \cdot \mu \cdot L} \qquad 16$$

The above equation applies to the case when the flow transducer is not rotating and will thus accurately describe a zero offset error. However, when the transducer is rotating the pressure drop is then dependent on the velocity profile and linear velocity of the transducer boundary. Since the velocity profile is unknown, the above relationship can still be applied as an approximation to provide a design estimate, whereupon the assumption is made that the flow measurement error due to an error in the differential pressure sensor measurement is approximately flow independent. Frequently, the accuracy of a measuring device is expressed as a percentage of the full scale output, (%F.S.O). To obtain these values one can employ the following equation:

$$\frac{F_e}{F_m} = \frac{\Delta P_e \cdot a^3}{16 \cdot \mu \cdot L \cdot 10^{-6} \cdot \pi \cdot f_m \cdot r \cdot (a - b)} \qquad 17$$

wherein
$F_e$ is the flow error due to pressure sensor measurement error, (S.I.);
$F_m$ if the full scale flow sensor output, (S.I.);
$\Delta P_e$ is the pressure sensor measurement error, (S.I.);
$f_m$ is the maximum shaft speed in RPM;
r is the radius of the transducer element, (mm);
a is the width of the flowpath (mm);
b is the depth of the bottom clearance, (mm); and
$\mu$ is the absolute gas viscosity, (S.I.).

The accuracy of the flow transducer is thus controlled by the dimensions of the flow channel, the absolute gas viscosity and the performance of the differential pressure sensor. The absolute gas viscosity is different for different gases and also increases with gas temperature.

In accordance with the above parameters, the following calculations of accuracy were made with respect to the flow of nitrogen under the specified condition (15° C., 14.7 psia) using the transducer described herein:

$$\mu = 1.74 \times 10^{-5} kg/m\text{-}s,$$

$f_m = 12,000$ RPM; $a = 0.94$ mm; $b = 0.05$ mm; $L = 112$ mm; $r = 20$ mm.

Accordingly, the following table provides a set of accuracy predictions for the flow sensor corresponding to the individual performance specifications of the differential pressure sensor (Honeywell Model No. 163PC01D36) with $\Delta P_e$ values taken from the manufacturer's specifications:

TABLE 1

|  | $\Delta P_e$ (± % F.S.O.) | $F_e$ (± l.p.m.) | $F_e$ (± % F.S.O.) |
|---|---|---|---|
| Repeatability & Hysteresis | 0.25 | 0.06 | 0.2 |
| Linearity |  |  |  |
| pt 2 > pt 1 (max) | 2 | 0.51 | 1.9* |
| pt 1 > pt 2 (max) | 1 | 0.26 | 0.9 |
| Combined Null & Sensitivity Shift 25C ± 10C, max. | 1 | 0.26 | 0.9 |

*Due to the difference in the linearity performance of the differential pressure sensor between positive and negative differential pressure, the flow transducer will have a different performance in one flow direction compared with the other.

EXAMPLES 2-4

The flowmeter described in Example 1 was used to compare the flow rate and transducer shaft speed. According to the geometric design parameters in Example 1 and Equation 2, the design relationship between the gas flow rate and the transducer shaft speed is:

$$\text{Flow rate} = 2.24 \times 10^{-3} \cdot f \qquad 18$$

The actual flowmeter response was measured versus metered flows of nitrogen and carbon dioxide.

Figure 6:
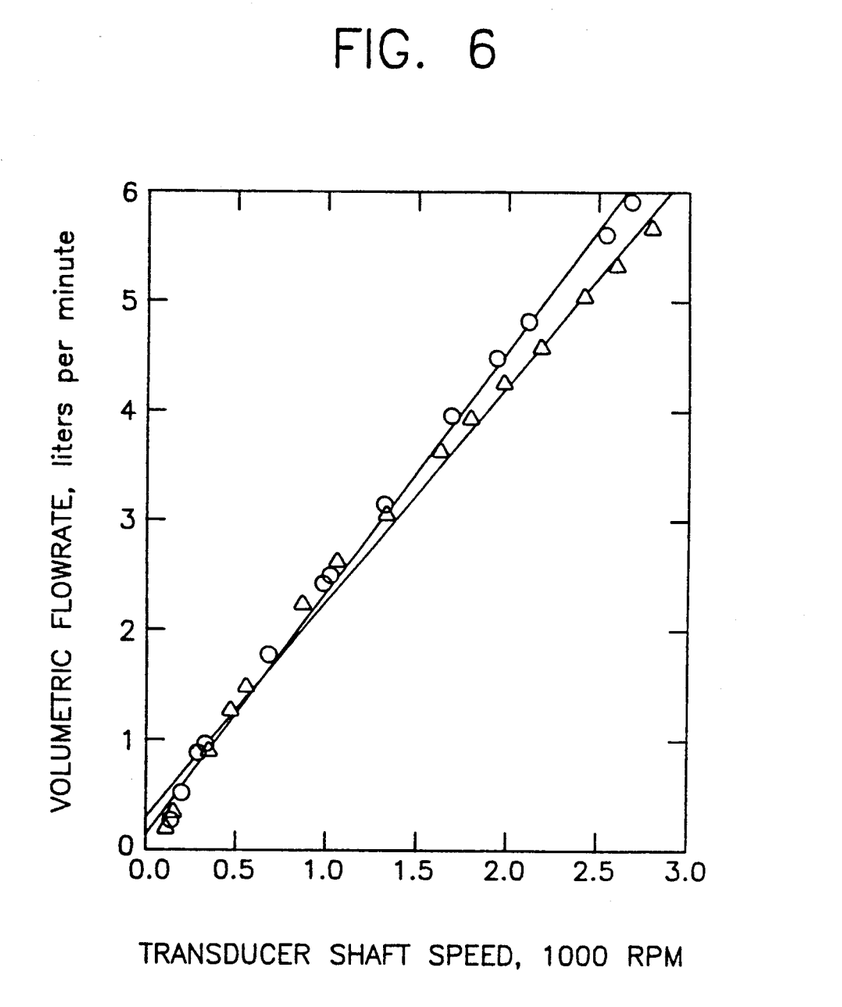
FIG. 6 is a graph showing the relationship of the flow rate and the speed of the transducer shaft.

As shown in FIG. 6, the volumetric gas flow rate in liters per minute was plotted against shaft speeds ranging up to 3,000 rpm. Temperatures and pressures were close to normal conditions. Straight line regressions are also shown in FIG. 6 which have coefficients as shown in Table 2.

TABLE 2

| ○ nitrogen | Flow = 2.12 × $10^{-3}$ RPM + 0.24 LPM |
|---|---|
| △ Carbon dioxide | Flow = 1.90 × $10^{-3}$ RPM + 0.38 LPM |

The offsets at zero shaft speed were 0.24 lpm for 0.38 lpm for carbon dioxide. The offset for nitrogen falls within the predicted zero error shown in Table 1 of 0.26 lpm, (0.9% F.S.O.). The offset for carbon dioxide is higher at about 1.5% F.S.O. This is partly due to the lower viscosity of carbon dioxide compared with nitrogen, which gives rise to a corresponding predicted zero error of 1.1% F.S.O. for carbon dioxide, and partly due to a small degree of nonlinearity in the carbon dioxide data in this part of the flow range. The slopes of the curves were $2.12 \times 10^{-3}$ for nitrogen and $1.90 \times 10^{-3}$ for carbon dioxide. These numbers fall within a $\pm 5\%$ range and compare well with the design value of $2.24 \times 10-3$. In addition, the data shows that the difference in the response of the flowmeter to flows comprising 100% nitrogen and carbon dioxide is $\pm 5\%$ for this particular design.

It should be noted that the range of tis data is restricted to the useful operating range of the 3 liter wet test meter used in the experiments.

Referring to FIGS. 7a–7d, there is shown test data in the form of a waveform which illustrates the transient response characteristics of the flowmeter described in Example 1. The top waveform shown in FIG. 7a serves as a reference and was taken using a 50 kHz bandwidth hot wire anemometer system.

The hot wire probes were positioned off-axis close to the flowmeter input port of the present invention about 10 flow diameters downstream of a Mitsubishi type flow conditioner [See *Flow Measurement Eng. Handbook*, R. W. Miller, FIG. 5.33, P. 42, (McGraw-Hill, 1983)]. The hot wire signal was calibrated versus the flow rate under steady conditions using a wet test meter. The bottom two traces shown in FIGS. 7c and 7d depict the simultaneous output of the differential pressure transducer and the motor current and are shown to illustrate further the operation of the control loop.

The flow waveform was generated by driving a flow control valve with an electrical signal which was modulated with a saw tooth waveform at a frequency of about 3.4 Hz. The resulting flow waveform, as measured by the hot wire anemometer, varied in saw tooth fashion between values of about 7 to 15 lpm. Comparing FIGS. 7a and 7b, one can see that these variations were tracked by the flowmeter with about 20% attenuation and a phase shift of about 35 degrees. This performance is indicative of a first order response time which is substantially less than 100 ms.

Figure 7A:
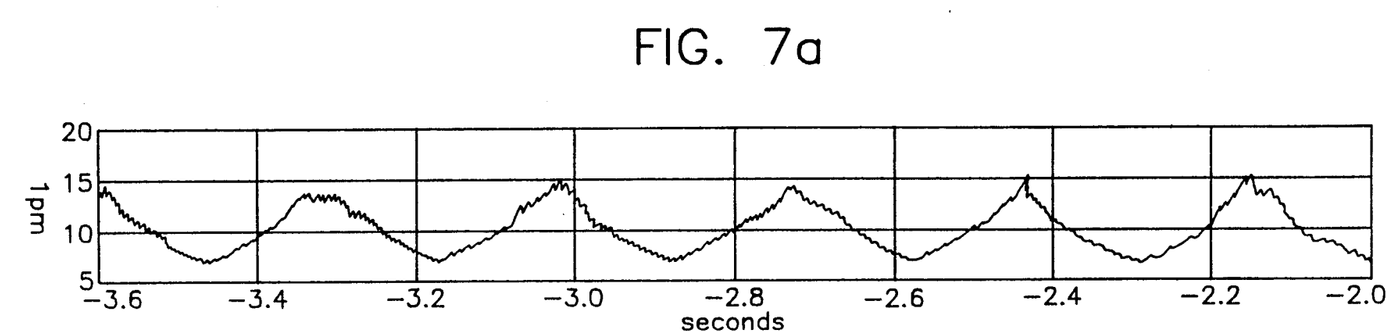
FIG. 7a is a plot of flow rate against time using a standard hot wire anemometer system.
Figure 7B:
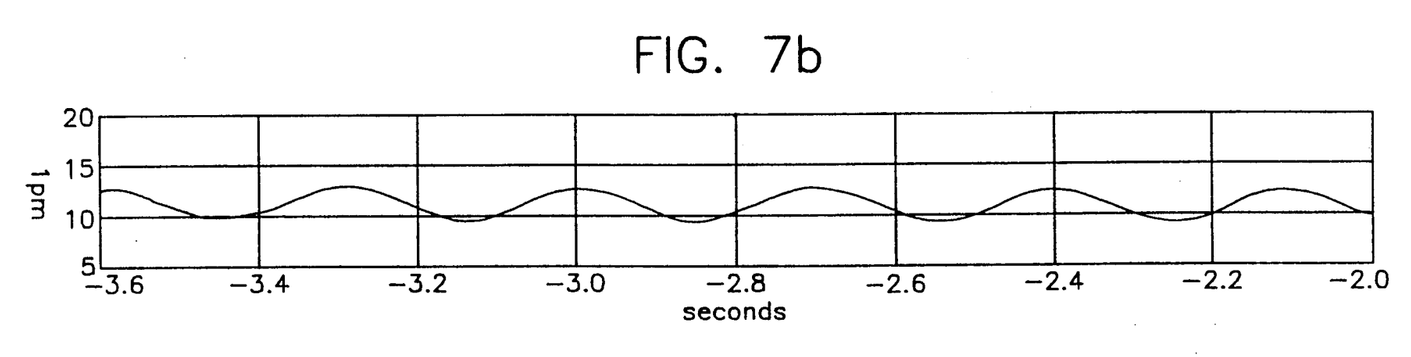
FIG. 7b is a plot of the changes in flow rate during operation of the flowmeter described in FIG. 1.
Figure 7C:
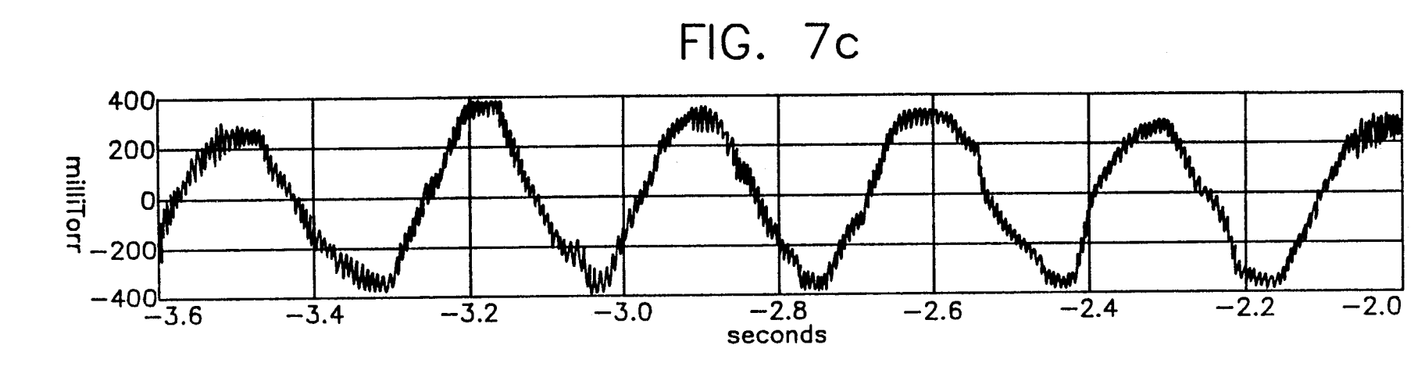
FIG. 7c is a plot of the changes of pressure drop during operation of the flowmeter described in FIG. 1.
Figure 7D:
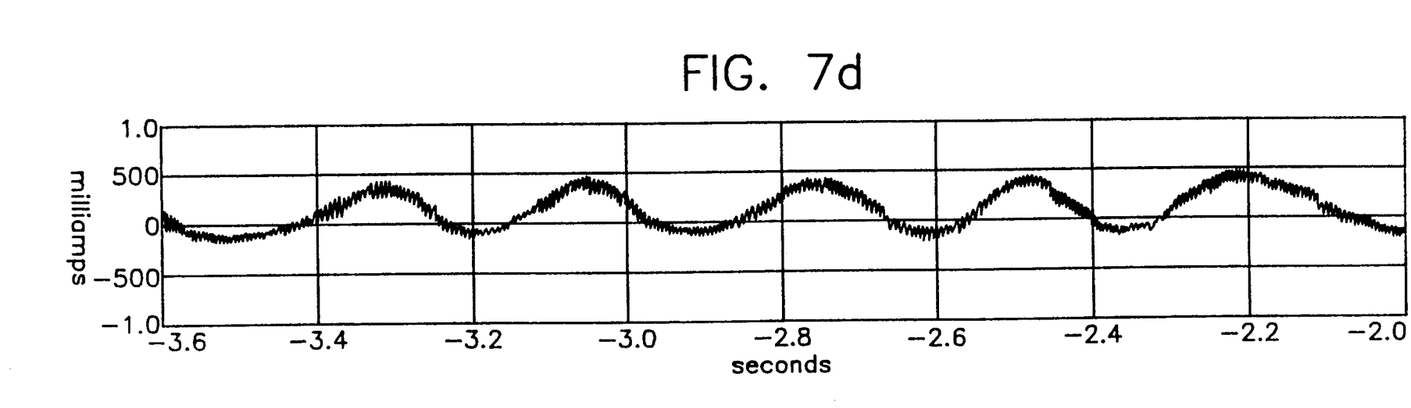
FIG. 7d is a plot of the changes in current of the motor during operation of the flowmeter described in FIG. 1.

FIG. 7c also illustrates that the pressure drop across the flowmeter is very low. The peak pressure difference under the varying flow conditions described was only about 400 millitorr. This is approximately equivalent to 0.008 psi or 0.5 cm $H_2O$.

FIGS. 7a to 7d also illustrate the operation of the control loop. The function of the control loop is illustrated by noting that the minima of the flow, as measured by the hot wire anemometer, closely coincide with the positive peaks of the differential pressure sensor output and negative peaks of the measured motor current and vice versa.

I claim:

1. Apparatus for metering the flow rate of a fluid comprising
   (a) transducer means for transferring the fluid from an inlet region to an outlet region of a conduit comprising a substantially cylindrical housing comprising a substantially circular wall defining a cylindrical cavity and a rotatable element substantially concentric to the housing which together define an arcuate pathway having substantially smooth boundaries for the flow of the fluid from the inlet region to the outlet region, said rotatable element having a smooth and unobstructed outer surface spaced apart from the circular wall to define said arcuate pathway, said pathway comprising a major portion for the passage of the fluid from the inlet to the outlet region of the conduit, and a minor portion which permits free rotation of the rotatable element within the cavity;
   (b) pressure change detecting means for detecting in the form of a pressure error signal a change of pressure of the fluid between the inlet and outlet regions and for translating the pressure error signal into a detectable signal; and
   (c) speed changing means operatively connected to the transducer means for changing the speed of the rotatable element in response to the detectable signal to reduce the differential pressure of the fluid between the inlet and outlet regions.

2. The apparatus of claim 1 wherein the speed changing means comprises motor means including a shaft operatively connected to the rotatable element for rotating the element within the housing and a servo amplifier adapted to receive the detectable signal from the pressure change detecting means and for transmitting the required power to the motor means for rotating the rotatable element.

3. The apparatus of claim 1 further comprising:
   (a) encoder means operatively connected to the motor means for emitting an output corresponding to the rate of rotation of the motor;
   (b) signal processing means for translating the output from the encoder means into a readable signal; and
   (c) readout means for displaying the readable signal as a measurement of the flow rate.

4. The apparatus of claim 3 wherein the encoder means comprises a low inertia optical encoder comprising a light beam, means to translate the rotation of the shaft into interruptions of the light beam and means for emitting electrical pulses corresponding to said interruptions of the light beam.

5. The apparatus of claim 3 further comprising:
   (a) means operatively connecting the pressure change detecting means and the signal processing means for converting the detectable signal obtained from the pressure change detecting means by a multiple to form an equivalent flow rate signal; and
   (b) signal processing means for combining the equivalent flow rate signal with the signal corresponding to the flowmeter system output to form a resulting signal, said signal processing means also translating the resulting signal and forwarding the translated signal to the readout means.

6. The apparatus of claim 1 wherein the depth of the minor portion of the pathway is less than the major portion.

7. The apparatus of claim 1 wherein the transducer means is constructed of a lightweight material.

8. Apparatus for metering the flow rate of a fluid comprising:
   (a) transducer means for transferring the fluid from an inlet region to an outlet region of a conduit comprising a substantially cylindrical housing and a rotatable element substantially concentric to the housing which together define an arcuate pathway for the flow of the fluid from the inlet region to the outlet region;
   (b) pressure change detecting means for detecting in the form of a pressure error signal a change of pressure of the fluid between the inlet and outlet regions and for translating the pressure error signal into a detectable signal;

(c) speed changing means operatively connected to the transducer means for changing the speed of the rotatable element in response to the detectable signal to reduce the differential pressure of the fluid between the inlet and outlet regions;

(d) encoder means operatively connected to the motor means for emitting an output corresponding to the rate of rotation of the motor;

(e) signal processing means for translating the output from the encoder means into a readable signal;

(f) readout means for displaying the readable signal as a measurement of the flow rate.

(g) means for converting the detectable signal obtained from the pressure change detecting means by a multiple to form an equivalent flow rate signal; and (h) the signal processing means combing the equivalent flow rate signal with the encoder output which corresponds to a flowmeter system output to form a resulting signal, said signal processing means also translating the resulting signal and forwarding the translated signal to the readout means.

9. The apparatus of claim 8 wherein the speed changing means comprises motor means including a shaft operatively connected to the rotatable element for rotating the element within the housing and a servo amplifier adapted to receive the detectable signal from the pressure change detecting means and for transmitting the required power to the motor means for rotating the rotatable element.

10. The apparatus of claim 8 wherein the encoder means comprises a low inertia optical encoder comprising a light beam, means to translate the rotation of the shaft into interruptions of the light beam and means for emitting electrical pulses corresponding to said interruptions of the light beam.

11. The apparatus of claim 8 wherein the arcuate pathway has boundaries which are substantially smooth.

12. The apparatus of claim 11 wherein the housing of the transducer means comprises a substantially circular wall defining a cylindrical cavity, said rotatable element having a smooth and unobstructed outer surface spaced apart from the circular wall to define said arcuate pathway, said pathway comprising a major portion for the passage of the fluid from the inlet to the outlet region of the conduit, and a minor portion which permits free rotation of the rotatable element within the cavity.

13. The apparatus of claim 12 wherein the depth of the minor portion of the pathway is less than the major portion.

14. The apparatus of claim 8 wherein the transducer means is constructed of a lightweight material.

* * * * *